(12) United States Patent
Zeng et al.

(10) Patent No.: US 9,674,418 B2
(45) Date of Patent: Jun. 6, 2017

(54) TWO-WAY PHOTOGRAPHING SYSTEM OF MOBILE TERMINAL AND METHOD FOR CONTROLLING THE SAME

(71) Applicant: GUANG DONG OPPO MOBILE TELECOMMUNICATIONS CORP., LTD., Guangdong (CN)

(72) Inventors: Yuanqing Zeng, Guangdong (CN); Chengyu Wu, Guangdong (CN)

(73) Assignee: GUANG DONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 0 days.

(21) Appl. No.: 14/787,642

(22) PCT Filed: Feb. 24, 2014

(86) PCT No.: PCT/CN2014/072465
§ 371 (c)(1),
(2) Date: Oct. 28, 2015

(87) PCT Pub. No.: WO2014/176945
PCT Pub. Date: Nov. 6, 2014

(65) Prior Publication Data
US 2016/0080622 A1    Mar. 17, 2016

(30) Foreign Application Priority Data

Apr. 28, 2013   (CN) .......................... 2013 1 0157633

(51) Int. Cl.
*H04N 5/225* (2006.01)
*G03B 17/17* (2006.01)
(52) U.S. Cl.
CPC ........... *H04N 5/2259* (2013.01); *G03B 17/17* (2013.01); *H04N 5/2254* (2013.01)

(58) Field of Classification Search
CPC ..... H04N 5/2259; H04N 5/2254; G03B 17/17
See application file for complete search history.

(56) References Cited

U.S. PATENT DOCUMENTS

| 2003/0036365 | A1 | 2/2003 | Kuroda |
| 2008/0068451 | A1 | 3/2008 | Hyatt |

(Continued)

FOREIGN PATENT DOCUMENTS

| CN | 1780389 A | 5/2006 |
| CN | 201042040 Y | 3/2008 |

(Continued)

OTHER PUBLICATIONS

English translation of the International Search Report dated Apr. 28, 2014 for corresponding International Application No. PCT/CN2014/072465, filed Feb. 24, 2014.

(Continued)

*Primary Examiner* — Padma Haliyur
(74) *Attorney, Agent, or Firm* — David D. Brush; Westman, Champlin & Koehler, P.A.

(57) ABSTRACT

Disclosed are a two-way photographing system of a mobile terminal and a control method. The system includes a rotating mirror, a lens and an approach sensing apparatus. The rotating mirror is rotatable around the axis to a front reflection state or a rear reflection state for reflecting the incident light to the lens. The rotating minor has a first end close to the front light entrance and a second end close to the rear light entrance. The approach sensing apparatus is located adjacent to the first end when the rotating minor is in the front reflection state or adjacent to the second end when the rotating mirror is in the rear reflection state, and configured to generate a first detecting signal when the (Continued)

rotating mirror is in the front reflection state and to generate a second detecting signal when the rotating mirror is in the rear reflection state.

19 Claims, 3 Drawing Sheets

(56) References Cited

U.S. PATENT DOCUMENTS

| 2012/0287333 | A1 | 11/2012 | Huang et al. | |
| 2014/0218587 | A1* | 8/2014 | Shah | G03B 5/00 348/340 |

FOREIGN PATENT DOCUMENTS

| CN | 101518051 A | 8/2009 |
| CN | 103259933 A | 8/2013 |
| JP | 2006180286 A | 7/2006 |
| KR | 20040077291 A | 9/2004 |
| KR | 20090077605 A | 7/2009 |
| WO | 2008036434 A1 | 3/2008 |

OTHER PUBLICATIONS

English translation of Chinese Office Action dated Jul. 2, 2014 for corresponding Chinese Application No. 201310157633.9.
European Search Report dated Sep. 5, 2016 for corresponding European Application No. 14792215.
Written Opinion of the European Searching Authority dated Sep. 5, 2016 for corresponding European Application No. 14792215.
English translation of the International Search Report and Written Opinion dated Apr. 28, 2014 for corresponding International Application No. PCT/CN2014/072465, filed Feb. 24, 2014.

* cited by examiner

TWO-WAY PHOTOGRAPHING SYSTEM OF MOBILE TERMINAL AND METHOD FOR CONTROLLING THE SAME

CROSS-REFERENCE TO RELATED APPLICATION

The present application is a U.S. national phase application of International Application No. PCT/CN2014/072465, filed with the State Intellectual Property Office of P. R. China on Feb. 24, 2014, which is incorporated by reference in its entirety and published as WO 2014/176945 A1, and is based upon and claims priority to Chinese Patent Application No. 201310157633.9, filed on Apr. 28, 2013, the contents of which are hereby incorporated by reference in their entireties.

TECHNICAL FIELD

The present disclosure relates to a mobile terminal technology, and more particularly to a two-way photographing system of a mobile terminal and a method for controlling a two-way photographing system of a mobile terminal.

BACKGROUND

The existing mobile terminal (such as a mobile phone or a tablet PC) is generally provided with a front camera and a rear camera. The front camera is typically used in a selfie or a video call. The rear camera is typically used for photographing or camera shooting. For the purpose of saving cost, the performance (pixel, etc.) of the front camera is poorer than that of the rear camera. In order to enable the front camera to achieve a photographing effect same as that of the rear camera and to save the cost, following configuration is adopted in the related art. A rotating apparatus is disposed in the mobile terminal for rotating a single camera to some angle, thus achieving an effect that the mobile terminal provided with two cameras may achieve. However, on one hand, a main chip (i.e. microcontroller) of the mobile terminal only can determine the current state of the camera by comparing the initiate state of the camera with a state switching operation. If the user switches the camera between the front-facing state and the rear-facing state frequently, it is hard to synchronously detect the rotation of the camera in real-time, such that it is hard to judge whether the camera is in the front-facing state or in the rear-facing state effectively and hard to switch the state of the camera, thus leading to a poor user experience. On the other hand, since the two-way camera only has two states, it is unnecessary to dispose a complex angle sensor for controlling and judging the rotation angle of the camera in the mobile terminal.

In different application situations, it is required to switch the camera between the front-facing state and the rear-facing state and also required to set a corresponding application according to different states. For example, when the user takes a photo of him by himself, the flash light is required to be shut down. Thus, it is necessary to detect the state of the camera reliably and to control the switch effectively.

SUMMARY

The present disclosure aims to solve the above problem existing in the related art that, the state of the camera cannot be detected effectively and it is hard to control the switch, thus resulting in a poor user experience. For this, the present disclosure provides a two-way photographing system of a mobile terminal and a control method thereof, which may reliably detect the state of the camera in real-time and effectively control the switch between the states, thus improving the user experience.

The technical solutions for solving the problem according to the present disclosure are as follows. A two-way photographing system of a mobile terminal is provided. The mobile terminal includes a front light entrance and a rear light entrance symmetrical to the front light entrance, and the two-way photographing system includes:

a camera module, including a rotating mirror and a lens, in which the rotating mirror is rotatable about an axis of the rotating mirror to a front reflection state for reflecting incident light through the front light entrance to the lens or a rear reflection state for reflecting incident light through the rear light entrance to the lens; the rotating mirror includes a first end close to the front light entrance and a second end close to the rear light entrance; and an approach sensing apparatus, located adjacent to the first end when the rotating mirror is in the front reflection state or adjacent to the second end when the rotating mirror is in the rear reflection state, and configured to detect the first end so as to generate a first detecting signal when the rotating mirror is in the front reflection state, and to detect the second end so as to generate a second detecting signal when the rotating mirror is in the rear reflection state.

In the two-way photographing system of a mobile terminal according to the present disclosure, the approach sensing apparatus includes:

a first approach sensor, located adjacent to the first end when the rotating mirror is in the front reflection state, and configured to detect the first end so as to generate the first detecting signal when the rotating mirror is in the front reflection state;

a second approach sensor, located adjacent to the second end when the rotating mirror is in the rear reflection state, and configured to detect the second end so as to generate the second detecting signal when the rotating mirror is in the rear reflection state; and a sensor baseplate, attached to the first approach sensor and the second approach sensor respectively, and configured to convert the first detecting signal and the second detecting signal.

In the two-way photographing system of a mobile terminal according to the present disclosure, the sensor baseplate is disposed on a side opposite to a reflective surface of the rotating mirror and having a center aligned with axis of the rotating mirror; the first approach sensor is located on the sensor baseplate and at an end adjacent to the front light entrance; and the second approach sensor is located on the sensor baseplate and at an end adjacent to the rear light entrance.

In the two-way photographing system of a mobile terminal according to the present disclosure, the two-way photographing system further includes: a main control chip, attached to the sensor baseplate, and configured to receive the first detecting signal and the second detecting signal, and to judge whether the camera is in a front light receiving state or in a rear light receiving state.

In the two-way photographing system of a mobile terminal according to the present disclosure, the main control chip is further configured to set an application in the mobile terminal according to a sate judgment of the camera.

In the two-way photographing system of a mobile terminal according to the present disclosure, the two-way photographing system further includes: a rotating driver, attached to the axis of the rotating mirror and the main control chip respectively, and configured to drive the rotating mirror to rotate in a clockwise direction or a counter-clockwise direction.

In the two-way photographing system of a mobile terminal according to the present disclosure, the sensor baseplate includes: a power supply, configured to supply power for the first approach sensor and the second approach sensor; and an analog-to-digital converting unit, configured to convert analog detecting signals generated by the first approach sensor and the second approach sensor to digital signals.

A method for controlling a two-way photographing system of the mobile terminal is also provided in the present disclosure. The method includes:

S1: reading a first detecting signal and a second detecting signal output by the approach sensing apparatus, judging whether the camera is in a front light receiving state or in a rear light receiving state, and executing step S2 if the camera is in the front light receiving state, executing step S3 if the camera is in the rear light receiving state;

S2: judging whether a first switch command for switching from the front light receiving sate to the rear light receiving state is received, if yes, controlling the rotating mirror to rotate to the rear reflection state and setting the application in the mobile terminal according to the rear reflection state;

S3: judging whether a second switch command for switching from the rear light receiving sate to the front light receiving state is received, if yes, controlling the rotating mirror to rotate to the front reflection state and setting the application in the mobile terminal according to the front reflection state.

In the method for controlling a two-way photographing system of the mobile terminal according to the present disclosure, in step S2, if the first switch command is not received, the application in the mobile terminal is set according to the front reflection state.

In the method for controlling a two-way photographing system of the mobile terminal according to the present disclosure, in step S3, if the second switch command is not received, the application in the mobile terminal is set according to the rear reflection state.

The two-way photographing system of a mobile terminal and a control method thereof according to the present disclosure may have following advantages. By disposing an approach sensing apparatus adjacent to the rotating mirror, the approach sensing apparatus may detect the first end of the rotating mirror when the rotating mirror is in the front reflection state, and detect the second end of the rotating mirror when the rotating mirror is in the rear reflection state, so as to judge whether the rotating mirror is in the front reflection state or in the rear reflection state. In this way, the state of the two-way camera may be reliably detected in real-time. If the user frequently switches the state of the camera, the state of the two-way camera may be switched and controlled quickly and effectively, and the application may be set according to different states, thus improving the user experience.

BRIEF DESCRIPTION OF THE DRAWINGS

The present disclosure will be described from the following embodiments made with reference to the accompanying drawings, in which.

DETAILED DESCRIPTION

In order to better understand the technical solutions, objectives and effects of the present disclosure, specific embodiments of the present disclosure are described in detail with reference to the accompany drawings.

Figure 1:
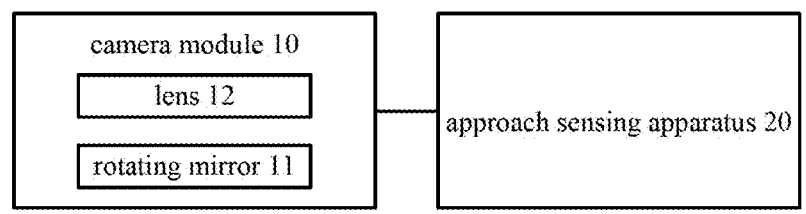
FIG. 1 is a block diagram of a two-way photographing system of a mobile terminal according to a first embodiment of the present disclosure.

FIG. 1 is a block diagram of a two-way photographing system of a mobile terminal according to a first embodiment of the present disclosure. As shown in FIG. 1, in a first embodiment of the present disclosure, a front light entrance is disposed on a front cover of the mobile terminal (such as a mobile phone or a tablet computer), and a rear light entrance symmetrical to the front light entrance is disposed on a rear cover of the mobile terminal. The two-way photographing system includes a camera module 10 and an approach sensing apparatus 20.

The camera module 10 includes a rotating mirror 11 and a lens 12. The rotating mirror 11 is a single sided total reflection prism. Assuming that the mobile terminal is laid with the front cover facing left, and the initial state of the rotating mirror 11 is a state in which the reflective surface of the rotating mirror 11 is parallel to the main light direction of the incident light. Then, after rotating about an axis of the rotating mirror 11 by a certain angle in a clockwise direction, the rotating mirror 11 reflects the incident light through the front light entrance to the lens 12, and at this time, the rotating mirror 11 is in a front reflection state. After rotating about the axis by a certain angle in a counter-clockwise direction, the rotating mirror 11 reflects the incident light through the rear light entrance to the lens 12, and at this time, the rotating mirror 11 is in a rear reflection state. If the mobile terminal is laid with the front cover facing right, then the rotating mirror 11 may be in the front reflection state after rotating about the axis by a certain angle along the counter-clockwise direction and in the rear reflection state after rotating about the axis by a certain angle along the clockwise direction. By rotating the rotating mirror 11 in the clockwise direction or the counter-clockwise direction, the light may enter the camera through the front reflection entrance or the rear reflection entrance, and thus a single camera may achieve an effect that a combination of a front camera and a rear camera may achieve. The rotating mirror 11 includes a first end close to the front light entrance and a second end close to the rear light entrance.

The approach sensing apparatus 20 is located adjacent to the first end when the rotating mirror 11 is in the front reflection state or adjacent to the second end when the rotating mirror 11 is in the rear reflection state, and configured to sense and detect the first end so as to generate a first detecting signal when the rotating mirror 11 is in the front reflection state, and to sense and detect the second end so as to generate a second detecting signal when the rotating mirror 11 is in the rear reflection state.

In the present disclosure, by disposing the approach sensing apparatus 20 adjacent to the first end when the rotating mirror 11 is in the front reflection state or adjacent to the second end when the rotating mirror 11 is in the rear reflection state, the first end or the second end is sensed and detected, and the reflection state of the rotating mirror 11 may be determined according to the detecting signal detected at the first end or the second end. In this way, the light receiving state of the camera may be detected reliably in real-time, and the state switch may be controlled effectively and the corresponding application may be set according to the detecting result.

Figure 2:
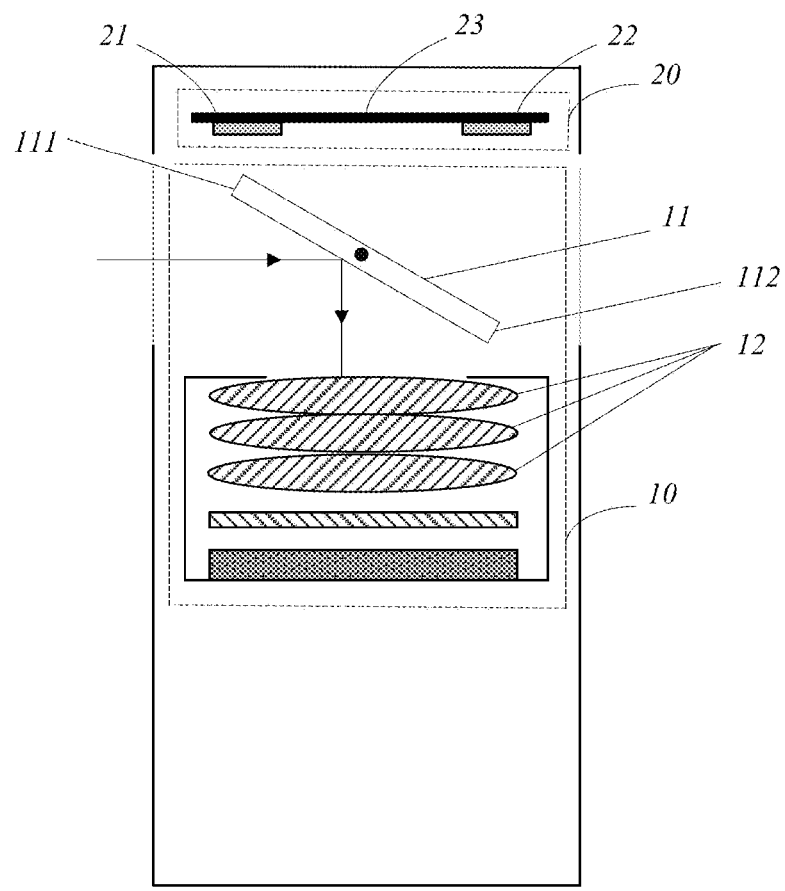
FIG. 2 is a schematic diagram showing the rotating mirror 11 in a front reflection state according to a first embodiment of the present disclosure.

FIG. 2 is a schematic diagram showing the rotating mirror 11 in a front reflection state according to a first embodiment of the present disclosure. As shown in FIG. 2, in the first embodiment of the present disclosure, the mobile terminal is laid with the front cover facing left, and the rotating mirror 11 is disposed between the front light entrance and the rear light entrance. A support of the camera module 20 is disposed on a same side as the reflective surface of the rotating mirror 11, and a center of the support is aligned with the axis of the rotating mirror 11. Other components of the camera module 20, including a lens 12, filter glass, and an image sensing chip, are disposed sequentially in the support. The rotation axis of the rotating mirror 11 is on the axis of the lens 12. The rotating mirror 11 rotates by a certain angle to the front reflection state with the axis of the lens 12 as the rotation axis, such that an angle is formed between the rotating mirror 11 and the main light path of the incident light, and thus the incident light through the front light entrance is reflected to the lens 12. At this time, the first end 111 close to the front light entrance is far away from the lens 12 and the second end 112 close to the rear light entrance is close to the lens 12.

The approach sensing apparatus 20 includes a first approach sensor 21, a second approach sensor 22 and a sensor baseplate 23. The first approach sensor 21 and the second approach sensor 22 are disposed on the sensor baseplate 23. Preferably, the sensor baseplate 23 is disposed on an opposite side to the reflective surface of the rotating mirror 11, and a center of the sensor baseplate 23 is aligned with the axis of the rotating mirror 11. If the sensor baseplate 23 and the lens 12 are disposed on a same side of the rotating mirror 11, the first approach sensor 21 and the second approach sensor 22 may be interfered by the lens 12. If the first approach sensor 21 and the second approach sensor 22 are separately disposed on two sides of the reflective surface of the rotating mirror 11, the size of the sensor baseplate 23 may be increased, the cost for the connections may be increased, and it is difficult to place the baseplate.

When the rotating mirror 11 is in the front reflection state, the first end 111 of the rotating mirror 11 is close to the sensor baseplate 23 and the second end 112 is far away from the sensor baseplate 23.

The first approach sensor 21 is located adjacent to the first end 111 when the rotating mirror 11 is in the front reflection state, such that the first end 111 is in the sensing range of the first approach sensor 21. Preferably, the first approach sensor 21 is located on the sensor baseplate 23 and at an end adjacent to the front light entrance. In a specific implementation, the first approach sensor 21 may be an approach switch (such as an inductance type switch, a capacitance type switch, a photoelectric type switch, a Hall type switch, and a pyroelectric type switch) for detecting in a non-contact manner whether there is something nearby or getting approach. When the rotating mirror 11 is in the front reflection state, the first approach sensor 21 detects the adjacent first end 111, and converts the sensing signal to an electric signal, so as to generate the first detecting signal.

The second approach sensor 22 is located adjacent to the second end 112 when the rotating mirror 11 is in the rear reflection state, such that the second end 112 is in the sensing range of the second approach sensor 22. Preferably, the second approach sensor 22 is located on the sensor baseplate 23 and at an end adjacent to the rear light entrance. The second approach sensor 22 is an approach switch having performances identical with that of the first approach sensor 21. When the rotating mirror 11 is in the front reflection state, the second end 112 is far away from the second approach sensor 22, and thus the second approach sensor 22 does not output the detecting signal.

In a specific implementation, the sensor baseplate 23 may be an integrated circuit board (e.g. a PCB), and is configured to support the first approach sensor 21 and the second approach sensor 22 and to convert the detecting signals output from the first approach sensor 21 and the second approach sensor 22.

Figure 3:
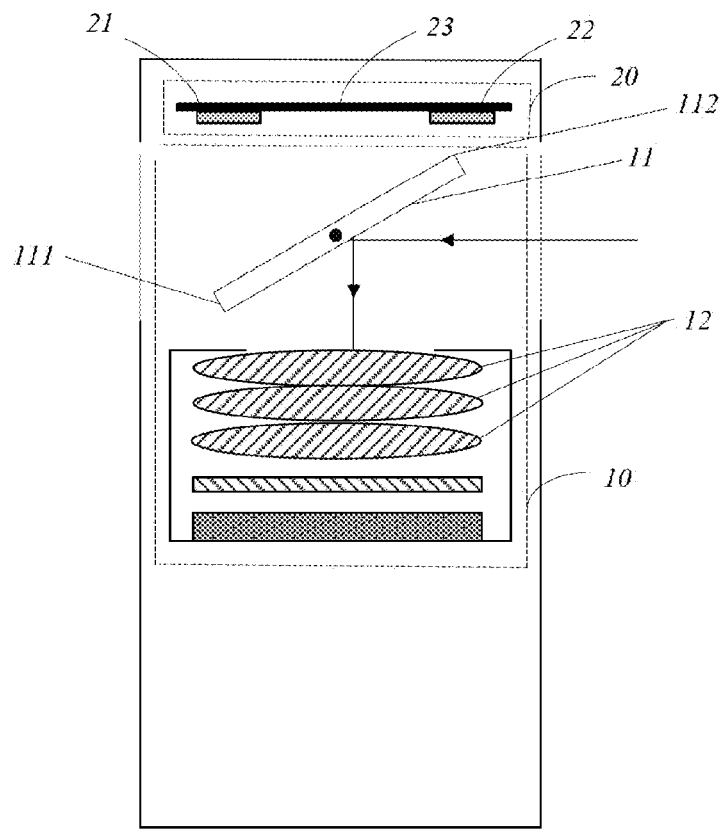
FIG. 3 is a schematic diagram showing the rotating mirror 11 in a rear reflection state according to a first embodiment of the present disclosure.

FIG. 3 is a schematic diagram showing the rotating mirror 11 in a rear reflection state according to a first embodiment of the present disclosure. As shown in FIG. 3, in the first embodiment of the present disclosure, the rotating mirror 11 rotates by a certain angle to the rear reflection state with the axis of the lens 12 as the rotation axis (if the rotating mirror 11 is in the front reflection state now, then the rotating mirror 11 rotates by 90° along the counter-clockwise direction to the rear reflection state), such that an angle is formed between the rotating mirror 11 and the main light path of the incident light through the rear light entrance, and thus the incident light through the rear light entrance is reflected to the lens 12. At this time, the first end 111 close to the front light entrance is far away from the sensor baseplate 23, and the second end 112 close to the rear light entrance is close to the sensor baseplate 23.

When the rotating mirror 11 is in the rear reflection state, the second approach sensor 22 detects the adjacent second end 112 and converts the sensing signal to the electric signal, so as to generate the second detecting signal. The first end 111 is far away from the first approach sensor 21, and thus the first approach sensor 21 does not output the detecting signal.

Figure 4:
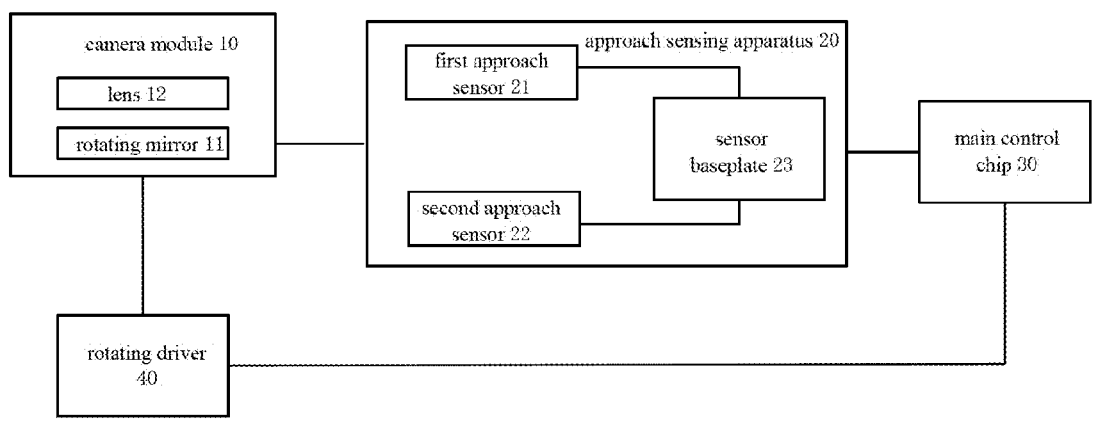
FIG. 4 is a block diagram of a two-way photographing system of a mobile terminal according to a second embodiment of the present disclosure.

FIG. 4 is a block diagram of a two-way photographing system of a mobile terminal according to a second embodiment of the present disclosure. As shown in FIG. 4, in a second embodiment of the present disclosure, besides the camera module 10 and the approach sensing apparatus 20 shown in the first embodiment of the present disclosure, the two-way photographing system further includes a main control chip 30 and a rotating driver 40.

The main control chip 30 is attached to the sensor baseplate 23, and configured to receive the first detecting signal and the second detecting signal. If the first detecting signal is an approach state signal and the second detecting signal is null, then it is determined that the camera is in a front light receiving state. If the first detecting signal is null and the second detecting signal is an approach state signal, then it is determined that the camera is in a rear light receiving state. Further, the main control chip 30 sets the application of the mobile terminal according to a state judgment of the camera.

The rotating driver 40 is attached to the axis of the rotating mirror 11, and is an actuator for driving the rotating mirror 11 to rotate in the clockwise direction or in the counter-clockwise direction. Except for being driven by a camera switching control operated by the user, the rotating driver 40 may also be attached to the main control chip 30 and drives the rotating mirror 11 to rotate in the clockwise direction or in the counter-clockwise direction according to a control command of the main control chip 30, such that the rotating mirror 11 may switch between the front reflection state and the rear reflection state.

Figure 5:
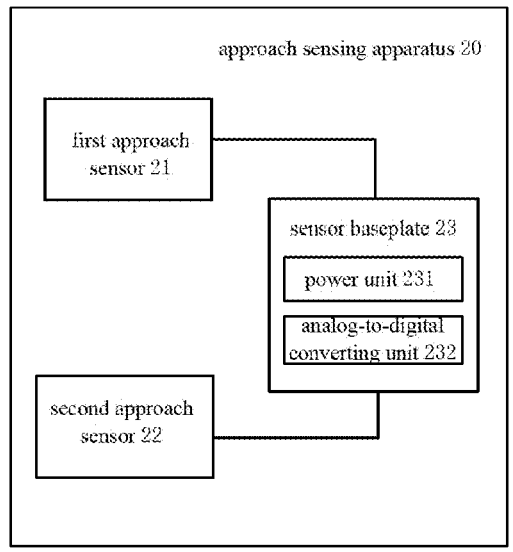
FIG. 5 is a block diagram of an approach sensing apparatus 20 according to a second embodiment of the present disclosure.

FIG. 5 is a block diagram of an approach sensing apparatus 20 according to a second embodiment of the present disclosure. As shown in FIG. 5, in the second embodiment of the present disclosure, the approach sensing apparatus 20 includes a first approach sensor 21, a second approach sensor 22, and a sensor baseplate 23. The sensor baseplate 23 includes a power unit 231 and an analog-to-digital converting unit 232. The power unit 231 supplies power for the first approach sensor 21 and the second approach sensor 22. The analog-to-digital converting unit 232 converts analog detecting signals generated by the first approach sensor 21 and the second approach sensor 22 to digital signals. For example, when the rotating mirror 11 is in the front reflection state, the first approach sensor 21 detects that the first end 111 is approaching and outputs the first analog detecting signal indicating the approaching, and then the analog-to-digital converting unit 232 converts the first analog detecting signal to a binary digital signal "1"; the second approach sensor 22 does not detect the second end 112 in the adjacent range and does not output a detecting signal, and then the analog-to-digital converting unit 232 outputs a binary digital signal "0". Similarly, when the rotating mirror 11 is in the rear reflection state, the analog-to-digital converting unit 232 converts the second analog detecting signal indicating the approaching to a binary digital signal "1", and converts the first analog detecting signal to a binary digital signal "0".

The sensor baseplate 30 sends the converted first detecting signal and the converted second detecting signal to the main control chip 30. The main control chip 30 determines that the camera is in the front light receiving state according to the first detecting signal "1" and the second detecting signal "0", and determines that the camera is in the rear light receiving state according to the first detecting signal "0" and the second detecting signal "1".

In the present disclosure, by replacing the complicated angle sensor with an approach sensing apparatus 20 having advantages of high precision and quick response, it is more convenient to detect and determine the reflection state of the rotating mirror 11 quickly and reliably, such that the main control chip 30 is readily to effectively control the switching of the photographing system and to set the application.

Figure 6:
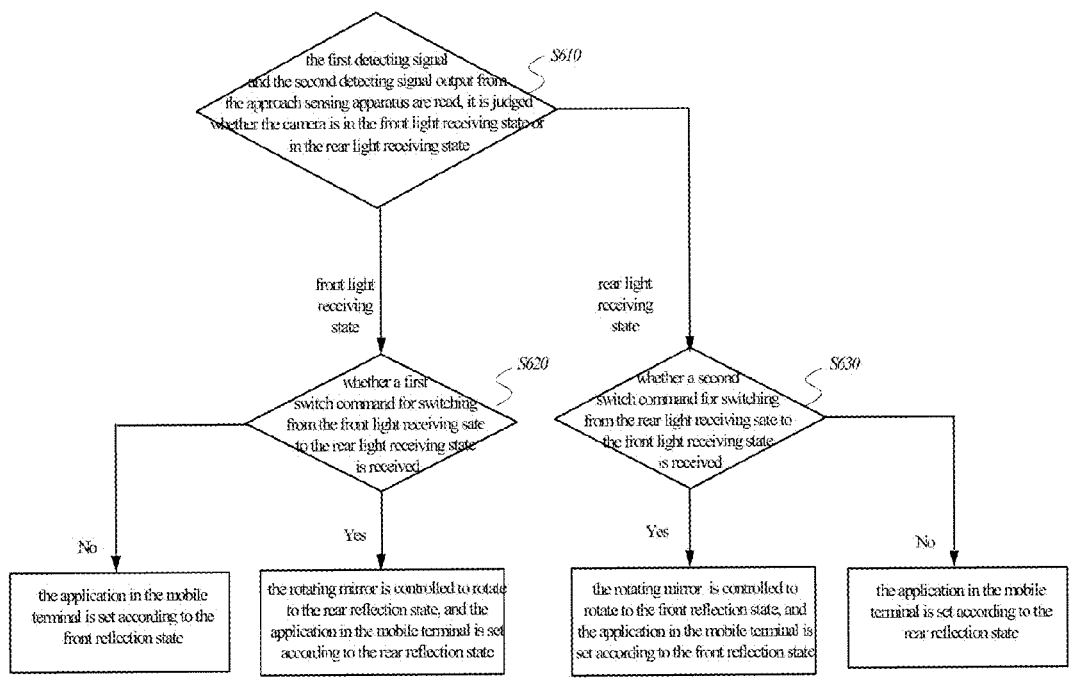
FIG. 6 is a flow chart showing a method for controlling a two-way photographing system of a mobile terminal according to a third embodiment of the present disclosure.

FIG. 6 is a flow chart showing a method for controlling a two-way photographing system of a mobile terminal according to a third embodiment of the present disclosure. As shown in FIG. 6, in a third embodiment of the present disclosure, the method includes following steps.

In step S610, the first detecting signal and the second detecting signal output from the approach sensing apparatus 20 are read. Assuming that the state signal "1" indicates an approaching state, and signal "0" indicates a leaving state. If the first detecting signal is "1" and the second detecting signal is "0", then it is determined that the camera is in the front light receiving state, and step S620 is executed. If the first detecting signal is "0" and the second detecting signal is "1", then it is determined that the camera is in the rear light receiving state, and step S630 is executed.

In step S620, it is judged whether a first switch command for switching from the front light receiving sate to the rear light receiving state is received. If yes, the rotating driver 40 is controlled to drive the rotating mirror 11 to rotate by 90° to the rear reflection state (whether the rotating mirror 11 rotates in the clockwise direction or in the counter-clockwise direction depends on the position of the rotating mirror 11 relative to the front light entrance and the rear light entrance), and the application in the mobile terminal is set according to the rear reflection state. If the first switch command is not received, the application in the mobile terminal is set according to the front reflection state.

In step S630, it is judged whether a second switch command for switching from the rear light receiving sate to the front light receiving state is received. If yes, the rotating driver 40 is controlled to drive the rotating mirror 11 to rotate by 90° to the front reflection state (whether the rotating mirror 11 rotates in the clockwise direction or in the counter-clockwise direction depends on the position of the rotating mirror 11 relative to the front light entrance and the rear light entrance), and the application in the mobile terminal is set according to the front reflection state. If the second switch command is not received, the application in the mobile terminal is set according to the rear reflection state.

In the present disclosure, the main control chip 30 only reads the detecting signals output from the approach sensing apparatus 20, and then determines the light receiving state of the camera directly according to the detecting signals, instead of comparing the initial state with the switching operation or calculating the data output from the angle sensor in the related art. If the user frequently switches the camera, the camera may be switched and controlled more quickly and effectively, thus improving the user experience.

Although explanatory embodiments have been shown and described with reference to the accompanying drawings, it would be appreciated by those skilled in the art that the above embodiments cannot be construed to limit the present disclosure. It is intended that the specification and examples be considered as exemplary only, and that various modifications and changes can be made without departing from the scope of the invention and the appended claims.

What is claimed is:

1. A two-way photographing system of a mobile terminal, wherein the mobile terminal comprises a front light entrance and a rear light entrance symmetrical to the front light entrance, and the two-way photographing system comprises:
 a camera module, comprising a rotating mirror and a lens, in which the rotating mirror is rotatable about an axis of the rotating mirror to a front reflection state for reflecting incident light through the front light entrance to the lens or a rear reflection state for reflecting incident light through the rear light entrance to the lens; wherein the incident light through the front and rear light entrances is first incident on the rotating mirror and then incident on the lens; and wherein the rotating mirror comprises a first end closer to the front light entrance than the rear light entrance and a second end closer to the rear light entrance than the front light entrance; and
 an approach sensing apparatus, located closer to the first end than the second end when the rotating mirror is in the front reflection state or closer to the second end than the first end when the rotating mirror is in the rear reflection state, and configured to detect the first end so as to generate a first detecting signal when the rotating mirror is in the front reflection state, and to detect the second end so as to generate a second detecting signal when the rotating mirror is in the rear reflection state, wherein the rotating mirror and the approach sensing apparatus are separate elements, and wherein the light incident from the front light entrance and the rear light entrance are reflected by the rotating mirror to the same lens.

2. The two-way photographing system according to claim 1, wherein the approach sensing apparatus comprises:

a first approach sensor, located adjacent to the first end when the rotating mirror is in the front reflection state, and configured to detect the first end so as to generate the first detecting signal when the rotating mirror is in the front reflection state;

a second approach sensor, located adjacent to the second end when the rotating mirror is in the rear reflection state, and configured to detect the second end so as to generate the second detecting signal when the rotating mirror is in the rear reflection state; and a sensor baseplate, attached to the first approach sensor and the second approach sensor respectively, and configured to convert the first detecting signal and the second detecting signal.

3. The two-way photographing system according to claim 2, wherein the sensor baseplate is disposed on a side opposite to a reflective surface of the rotating mirror and having a center aligned with axis of the rotating mirror;

the first approach sensor is located on the sensor baseplate and at an end adjacent to the front light entrance; and the second approach sensor is located on the sensor baseplate and at an end adjacent to the rear light entrance.

4. The two-way photographing system according to claim 1, further comprising:

a main control chip, attached to the sensor baseplate, and configured to receive the first detecting signal and the second detecting signal, and to judge whether the camera module is in a front light receiving state or in a rear light receiving state.

5. The two-way photographing system according to claim 4, wherein the main control chip is further configured to set an application in the mobile terminal according to a sate judgment of the camera module.

6. The two-way photographing system according to claim 4, further comprising:

a rotating driver, attached to the axis of the rotating mirror and the main control chip respectively, and configured to drive the rotating mirror to rotate in a clockwise direction or in a counter-clockwise direction.

7. The two-way photographing system according to claim 2, wherein the sensor baseplate comprises:

a power unit, configured to supply power for the first approach sensor and the second approach sensor; and an analog-to-digital converting unit, configured to convert analog detecting signals generated by the first approach sensor and the second approach sensor to digital signals.

8. A method for controlling a two-way photographing system of a mobile terminal wherein the mobile terminal comprises a front light entrance and a rear light entrance symmetrical to the front light entrance, and wherein the two-way photography system comprises:

a camera module, comprising a rotating mirror and a lens, in which the rotating mirror is rotatable about an axis of the rotating mirror to a front reflection state for reflecting incident light through the front light entrance to the lens or a rear reflection state for reflecting incident light through the rear light entrance to the lens; the rotating mirror comprises a first end close to the front light entrance and a second end close to the rear light entrance; and an approach sensing apparatus, located closer to the first end when the rotating mirror is in the front reflection state or closer to the second end when the rotating mirror is in the rear reflection state, and configured to detect the first end so as to generate a first detecting signal when the rotating mirror is in the front reflection state, and to detect the second end so as to generate a second detecting signal when the rotating mirror is in the rear reflection state, the method comprising:

S1: reading the first detecting signal and the second detecting signal output by the approach sensing apparatus, judging whether the camera is in a front light receiving state or in a rear light receiving state, and executing step S2 if the camera is in the front light receiving state, executing step S3 if the camera is in the rear light receiving state;

S2: judging whether a first switch command for switching from the front light receiving sate to the rear light receiving state is received, if yes, controlling the rotating mirror to rotate to the rear reflection state and setting the application in the mobile terminal according to the rear reflection state;

S3: judging whether a second switch command for switching from the rear light receiving sate to the front light receiving state is received, if yes, controlling the rotating mirror to rotate to the front reflection state and setting the application in the mobile terminal according to the front reflection state.

9. The method according to claim 8, wherein in step S2, if the first switch command is not received, the application in the mobile terminal is set according to the front reflection state.

10. The method according to claim 8, wherein in step S3, if the second switch command is not received, the application in the mobile terminal is set according to the rear reflection state.

11. The two-way photographing system according to claim 2, further comprising:

a main control chip, attached to the sensor baseplate, and configured to receive the first detecting signal and the second detecting signal, and to judge whether the camera module is in a front light receiving state or in a rear light receiving state.

12. A two-way photographing system of a mobile terminal, wherein the mobile terminal comprises a front light entrance and a rear light entrance symmetrical to the front light entrance, and the two-way photographing system comprises:

a rotating mirror, rotatable about an axis thereof to a front reflection state for reflecting incident light through the front light entrance or a rear reflection state for reflecting incident light through the rear light entrance, and comprising a first end closer to the front light entrance than the rear light entrance and a second end closer to the rear light entrance than the front light entrance; and an approach sensing apparatus, located closer to the first end than the second end when the rotating mirror is in the front reflection state or closer to the second end than the first end when the rotating mirror is in the rear reflection state, and configured to detect the first end so as to generate a first detecting signal when the rotating mirror is in the front reflection state, and to detect the second end so as to generate a second detecting signal when the rotating minor is in the rear reflection state, wherein the approach sensing apparatus comprises:
- a first approach sensor, located adjacent to the first end and configured to detect the first end so as to generate the first detecting signal when the rotating mirror is in the front reflection state; and
- a second approach sensor, located adjacent to the second end and configured to detect the second end so as to generate the second detecting signal when the rotating mirror is in the rear reflection state;

wherein the first approach sensor is located closer to the first end than the second approach sensor is located relative to the second end when the rotating mirror is in the front reflection state, and wherein the second approach sensor is located closer to the second end than the first approach sensor is located relative to the first end when the rotating mirror is in the rear reflection state; and wherein the rotating mirror and the approach sensing apparatus are separate elements.

13. The two-way photographing system according to claim 12, wherein the approach sensing apparatus further comprises:
- a sensor baseplate, attached to the first approach sensor and the second approach sensor respectively, and configured to convert the first detecting signal and the second detecting signal.

14. The two-way photographing system according to claim 13, wherein
the sensor baseplate is disposed on a side opposite to a reflective surface of the rotating mirror and having a center aligned with axis of the rotating mirror;
the first approach sensor is located on the sensor baseplate and at an end adjacent to the front light entrance; and
the second approach sensor is located on the sensor baseplate and at an end adjacent to the rear light entrance.

15. The two-way photographing system according to claim 12, further comprising:
a main control chip, attached to the sensor baseplate, and configured to receive the first detecting signal and the second detecting signal, and to judge whether the camera module is in a front light receiving state or in a rear light receiving state.

16. The two-way photographing system according to claim 15, wherein the main control chip is further configured to set an application in the mobile terminal according to a state judgment of the camera module.

17. The two-way photographing system according to claim 15, further comprising:
a rotating driver, attached to the axis of the rotating mirror and the main control chip respectively, and configured to drive the rotating mirror to rotate in a clockwise direction or in a counter-clockwise direction.

18. The two-way photographing system according to claim 13, wherein the sensor baseplate comprises:
- a power unit, configured to supply power for the first approach sensor and the second approach sensor; and
- an analog-to-digital converting unit, configured to convert analog detecting signals generated by the first approach sensor and the second approach sensor to digital signals.

19. The two-way photographing system according to claim 12, further comprising:
a lens, configured to receive light reflected by the rotating mirror, wherein the incident light through the front and rear light entrances is first incident on the rotating mirror and then incident on the lens.

* * * * *

UNITED STATES PATENT AND TRADEMARK OFFICE
CERTIFICATE OF CORRECTION

PATENT NO. : 9,674,418 B2
APPLICATION NO. : 14/787642
DATED : June 6, 2017
INVENTOR(S) : Yuanqing Zeng and Chengyu Wu Page 1 of 1

It is certified that error appears in the above-identified patent and that said Letters Patent is hereby corrected as shown below:

On the Title Page

Item [57], Line 6, delete "minor" and insert --mirror--
Item [57], Line 9, delete "minor" and insert --mirror--

In the Claims

Claim 8, Column 10, Line 23, delete "sate" and insert --state--
Claim 8, Column 10, Line 29, delete "sate" and insert --state--

Claim 12, Column 11, Line 2, delete "minor" and insert --mirror--

Signed and Sealed this
Twenty-sixth Day of March, 2019

Andrei Iancu
*Director of the United States Patent and Trademark Office*